United States Patent [19]
Touval et al.

[11] 3,876,549
[45] Apr. 8, 1975

[54] FLAME RETARDANT POLYMER COMPOSITIONS COMPRISING CHLORINATED CYCLOALIPHATIC HYDROCARBONS AND HYDRATED STANNIC OXIDE

[76] Inventors: Irving Touval, Edison; Herbert H. Waddell, Berkley Heights, both of N.J.

[22] Filed: Apr. 1, 1974

[21] Appl. No.: 456,761

Related U.S. Application Data

[60] Continuation-in-part of Ser. No. 223,283, Feb. 3, 1972, abandoned, which is a division of Ser. No. 68,521, Aug. 3, 1970, abandoned.

[52] U.S. Cl............ 252/8.1; 117/138; 260/45.75 K; 161/403
[51] Int. Cl................................................ C09k 3/28
[58] Field of Search................. 117/138; 252/8.1; 260/45.75 K

[56] References Cited
UNITED STATES PATENTS

| | | | |
|---|---|---|---|
| 1,990,292 | 2/1935 | Leatherman | 117/138 |
| 3,158,588 | 11/1964 | Johnson | 260/45.75 |
| 3,361,487 | 1/1968 | Zimmermann et al. | 260/45.75 X |
| 3,418,263 | 12/1968 | Hindersinn | 260/45.75 X |
| 3,524,761 | 8/1970 | Humphrey | 117/138 |
| 3,718,584 | 2/1973 | Beste et al. | 252/8.1 |

*Primary Examiner*—Leland A. Sebastian
*Attorney, Agent, or Firm*—Robert P. Auber; Kenneth G. Wheeless; Robert Spector

[57] ABSTRACT

The combination of hydrated stannic oxide with certain cyclic chlorine-containing hydrocarbons imparts a singularly high level of flame retardancy to polyolefins. The combination is more efficient that prior art compositions containing mixtures of antimony trioxide and either chlorinated paraffin waxes or the present chlorine-containing cyclic hydrocarbons.

4 Claims, No Drawings

FLAME RETARDANT POLYMER COMPOSITIONS COMPRISING CHLORINATED CYCLOALIPHATIC HYDROCARBONS AND HYDRATED STANNIC OXIDE

This application is a continuation-in-part of copending application Ser. No. 223,283, filed on Feb. 3, 1972, now abandoned, which in turn is a divisional application of application Ser. No. 68,521, filed Aug. 3, 1970, now abandoned.

BACKGROUND

This invention relates to flame retarding agents for polyolefins. This invention further relates to a synergist which can be effectively used in combination with a relatively stable class of chlorinated hydrocarbons.

It is known that a variety of metal oxides, particularly antimony trioxide, act synergistically with aliphatic organic halogen sources, thereby substantially increasing the effectiveness of these halogen sources as flame retardants. This decreases the relative concentration of halogen source required to attain a given level of flame retardancy, as measured, for example, using the Limiting Oxygen Index value, i.e. the minimum concentration of oxygen in a nitrogen-oxygen mixture which is necessary to support combustion. Antimony trioxide is conventionally used for this purpose in combination with chlorinated paraffin waxes, which decompose at temperatures between 70° and 190°C. with the liberation of atomic chlorine. It is believed that antimony trioxide lowers the decomposition temperature of the paraffin waxes by between 15° and 50°C. It is therefore apparent that combinations of antimony trioxide and chlorinated paraffin waxes are useful only for those polymers which are processed at temperatures below about 180°C. This excludes a number of commercially useful polymers, particularly polypropylene and poly(-vinyl chloride). The chlorine source frequently employed with these polymers is the class of chlorinated cycloaliphatic hydrocarbons, particularly those which are relatively non-volatile, melt at temperatures between 100° and 500°C. and decompose in the range between 300° and 500°C., thereby assuring an adequate supply of chlorine at flame temperatures while remaining substantially unaffected at temperatures employed to process high melting polymers. Representative members of this class of cyclic chlorine sources include hexachlorocyclopentadiene and reaction products of this compound, either with itself to produce perchloropentacyclodecane, or with other halogenated or non-halogenated cyclic dienes such as 1,5-cyclooctadiene. When used in combination with antimony trioxide these cyclic chlorine sources are not nearly so effective in raising the limiting oxygen index of the substrate polymer as are the corresponding linear chlorinated paraffins.

It is therefore an object of this invention to provide a synergist for use with chlorine-containing cycloaliphatic hydrocarbons that is more effective than antimony trioxide.

It has now been found that hydrated stannic oxide will interact with chlorinated cycloaliphatic hydrocarbons to provide a higher level of flame retardancy than can be attained using antimony oxide.

SUMMARY OF THE INVENTION

The present flame retardant polymer compositions consist essentially of a polyolefin and between 4 and 25%, based on the weight of said polyolefin, of a mixture containing (1) hydrated stannic oxide and (2) a chlorinated cycloaliphatic hydrocarbon exhibiting a melting point of between 100°–500°C. and which decomposes to the extent of 50 to 100% at temperatures between 300°–500°C., wherein the weight ratio of the hydrated stannic oxide to the chlorine-containing cycloaliphatic hydrocarbon is between 1:1 and 1:8, respectively.

DETAILED DESCRIPTION OF THE INVENTION

Hydrated stannic oxide exhibits the general formula $SnO_2 \cdot 0.5-2H_2O$. This compound is a more effective synergist than the anhydrous oxide when used in combination with the present cyclic chlorine-containing hydrocarbons. This is surprising considering the fact that the anhydrous oxide has the higher tin content of the two (77% by weight of tin for the anhydrous oxide, compared with between 62 and 67% for the hydrated form). When used at equal concentration levels the present compositions exhibit a higher degree of flame retardancy than corresponding materials wherein the hydrated stannic oxide is replaced by antimony trioxide. This superior performance is not observed using chlorine-containing aliphatic hydrocarbons such as the chlorinated paraffin waxes, in which instance the compositions containing antimony trioxide are the more effective ones. The present compositions are also considerably less toxic than those containing antimony trioxide. This is particularly advantageous when the final product containing the flame retardant is a toy or other article which is handled by young children.

The particle size of the hydrated stannic oxide is such that substantially all of the particles will pass through a 325 mesh screen of the U.S. standard screen series, which is equivalent to an average particle size of 44 microns.

Hydrated stannic oxide can be prepared by reacting stannic chloride with an aqueous solution of a basic salt such as sodium carbonate. The resultant precipitate is isolated and dried to obtain hydrated stannic oxide of the desired particle size. Since dehydration of the oxide to the anhydrous form occurs at a temperature above about 400°C., the product should not be exposed to these temperatures for any extended period of time during the drying operation.

Hydrated stannic oxide is known to impart acceptable levels of flame retardancy to cellulosic materials, particularly fabrics, as disclosed in U.S. Pat. No. 1,990,292. However, the oxide is virtually ineffective as a flame retardant for synthetic polymers, including polyolefins, in the absence of an organic compound which functions as a source of halogen at flame temperatures. While many classes of halogen-containing organic compounds will function more or less effectively in combination with hydrated stannic oxide, certain chlorine-containing cyclic hydrocarbons are especially suitable since they impart a level of flame retardancy to polyolefins which cannot be achieved using other known synergists, particularly antimony trioxide, one of the materials most widely used for this purpose.

The chlorinated cyclic hydrocarbons of this invention contain between 50 and 78% by weight of chlorine and one or more cyclic hydrocarbon radicals and melt between about 100° and 500°C. In addition, the compounds are relatively stable at temperatures employed to process the normally flammable polyolefin, which may be as high as 250°C. for polypropylene, yet decompose rapidly at temperatures between about 300° and 500°C. with liberation of chlorine. Less stable halogenated hydrocarbons, such as the chlorinated paraffin waxes, decompose to a significant degree at the melting temperature of many polyolefins, resulting in loss of flame retarding agent. In addition to reducing flame retardancy, premature decomposition of the hydrocarbon releases free chlorine that can adversely affect polymer properties, particularly color and strength. Chlorine will also corrode metal surfaces of the equipment used to process the polymer, particularly at elevated temperatures. The temperature at which a compound decomposes is readily determined by thermogravimetric analysis, which measures the weight loss of a compound as a function of temperature.

Compounds containing less than about 50% by weight of chlorine are usually not suitable for use in the present compositions. All other factors being equal, the level of flame retardancy imparted by a given weight of any chlorinated hydrocarbon is usually proportional to the chlorine content of the compound. If the compound contains less than about 50% by weight of chlorine the high concentration required to achieve the desired level of flame retardancy may adversely affect the physical properties of the substrate polymer to the extent that the resultant composition may be unsuitable for the intended end use.

Suitable chlorinated cyclic aliphatic hydrocarbons include compounds containing one or more carbocyclic radicals. If more than one ring is present, they can be either joined by one carbon-carbon bond or fused, as in the case of perchloropentacyclodecane, a Diels-Alder reaction product of hexachlorocyclopentadiene. This compound is disclosed in U.S. Pat. No. 2,996,553.

Other chlorinated hydrocarbons suitable for use in the present compositions include saturated compounds such as the chlorinated cyclopentanes, cyclohexanes and higher homologs and compounds wherein a non-aromatic carbocyclic radical contains one or more carbon-carbon double bonds, such as the aforementioned hexachlorocyclopentadiene,

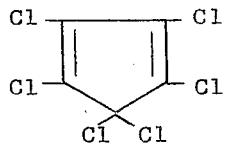

The unsaturated compounds can be present either in an unreacted form or as a Diels-Alder addition product of the compound with itself or with a second unsaturated hydrocarbon that will react to form a bicyclic or other polycyclic structure. An example of the latter is the product obtained by reacting 2 moles of hexachlorocyclopentadiene per mole of 1,5-cyclooctadiene. The aforementioned second unsaturated compound may contain chlorine, however this is not a requirement so long as the product contains more than 50% by weight of chlorine, as specified hereinbefore, and meets the requirements of melting and decomposition temperatures that characterize the present invention. These temperature values are either available in the chemical literature or can readily be determined using differential thermal analysis.

At flame temperatures the chlorinated cyclic hydrocarbon interacts with the hydrated stannic oxide to yield the high levels of flame retardancy that characterize the present compositions. To achieve optimum performance the weight of the chlorinated hydrocarbon should be between 1 and 8 times the weight of the hydrated stannic oxide.

The present combinations of hydrated stannic oxide and chlorinated cyclic hydrocarbon effectively flame retard polymers derived from olefins containing between 2 and 12 carbon atoms. The olefin can be either homopolymerized or copolymerized with one or more other olefins or unsaturated compounds which are copolymerizable with olefins. Suitable comonomers in addition to olefins include maleic acid or anhydride, esters of acrylic or methacrylic acid with alcohols containing between 1 and about 10 carbon atoms and vinyl esters of saturated carboxylic acids containing between 1 and 10 carbon atoms, such as vinyl acetate.

Among the suitable olefins are ethylene, propylene, butylene, isobutylene, isoprene, styrene, $\alpha$-methyl styrene, and neoprene. Homopolymers and copolymers derived from diolefins such as butadiene can also be effectively flame retarded using the present compositions.

The concentration of the chlorinated hydrocarbon-hydrated stannic oxide mixture required to impart an effective level of flame retardancy to a given polyolefin will vary somewhat depending upon the type of polymer, the temperature to be encountered during processing of the polymer, the presence of flammable additives in the polymer composition and the level of flame retardancy desired. In most instances the concentration of the flame retarding agent will be between 4 and 25%, based on the weight of the polyolefin.

The following examples demonstrate preferred embodiments of the present invention and should not be interpreted as limiting the scope thereof, either with regard to suitable chlorinated hydrocarbons or normally flammable polyolefin.

A convenient means for expressing the flammability of a polymer sample is in terms of the Limiting Oxygen Index, often referred to as the L.O.I. value. This value is obtained by igniting the sample in atmosphere containing known amounts of nitrogen and oxygen. The minimum concentration of oxygen which will support combustion of the sample is determined using a suitable apparatus such as that described in the November, 1966 issue of Modern Plastics at pages 141-148. The L.O.I. value is calculated using the formula $[O_2]/([O_2] + [N_2]) \times 100$ wherein $[O_2]$ and $[N_2]$ represent the relative amounts of oxygen and nitrogen, respectively, expressed in any convenient units such as flow rate in cubic centimeters per minute.

EXAMPLE 1

This example demonstrates the high level of flame retardancy imparted to polyethylene by the present combination of hydrated stannic oxide with a chlorinated cyclic hydrocarbon and compares the values with those obtained using prior art flame retardants, namely antimony trioxide, anhydrous stannic oxide and a chlorinated paraffin wax.

The test samples were prepared by melting 100 parts by weight of polyethylene (type NA285, available from U.S. Industries) at 110°C. using a 2-roll mill and gradually adding the desired amounts of stannic or antimony oxide and chlorine source together with 0.8 part of pentaerythritol as a stabilizer to the polymer melt. The resulting homogeneous sheet was removed from the mill, pressed and then cut into strips measuring 1/8 × 1/4 × 6 inches. The Limiting Oxygen Index (L.O.I.) values for each of the samples tested are summarized in the following Table 1.

TABLE 1

| SAMPLE NO. | Oxide(parts) | | Chlorine Source (parts) | | L.O.I. |
| --- | --- | --- | --- | --- | --- |
| 1 | Hydrated $SnO_2$ | (2) | Perchloropentacyclodecane | (8) | 20.6 |
| 2 | " | (4) | " | (8) | 22.6 |
| 3 | " | (6) | " | (8) | 23.3 |
| 4 | " | (8) | " | (8) | 23.6 |
| 5 | " | (10) | " | (8) | 23.7 |
| 6 | " | (12) | " | (12) | 24.1 |
| 7 | " | (8) | Chlorinated Paraffin Wax | (8) | 22.9 |
| 8 (control) | $Sb_2O_3$ | (8) | " | (8) | 23.8 |
| 9 | Hydrated $SnO_2$ | (10) | Perchloropentacyclodecane | (20) | 24.2 |
| 10 (control) | $Sb_2O_3$ | (10) | " | (20) | 23.0 |
| 11 (control) | " | (8) | " | (8) | 22.8 |
| 12 (control) | Anhdr. $SnO_2$ | (8) | " | (8) | 22.1 |

It is apparent from these data that while antimony trioxide is the superior synergist using a chlorinated paraffin wax as the chlorine source, it is considerably less effective than hydrated stannic oxide in the presence of the cyclic chlorine source (perchloropentacyclodecane, a Diels-Alder addition product obtained from hexachlorocyclopentadiene). Anhydrous stannic oxide is inferior to both the hydrated form and antimony trioxide using perchloropentacyclodecane.

EXAMPLE 2

This example demonstrates the effectiveness of the present compositions as flame retarding agents for polypropylene. The procedure for preparing the test samples is the same as that described in the foregoing Example 1 with the exception that the temperature of the mill was 163°C. and no stabilizer was employed. The type of polypropylene was Profax 6523, available from Hercules, Inc. The test specimens measured 1/8 × 1/4 × 6 inches.

The L.O.I. values obtained for the samples tested are summarized in Table 2. The parts by weight of oxide and chlorine source were 10 and 15, respectively, based on 100 parts by weight of polymer.

TABLE 2

| Sample No. | Oxide | | Chlorine Source | L.O.I. |
| --- | --- | --- | --- | --- |
| 1 | Hydrated | $SnO_2$ | Perchloropentacyclodecane | 221 |
| 2 (control) | | $Sb_2O_3$ | " | 212 |
| 3 | Hydrated | $SnO_2$ | Diels-Alder product[1] | 221 |
| 4 (control) | | $Sb_2O_3$ | " | 215 |
| 5 (control) | None | | None | 177 |

[1] A Diels Alder addition product obtained by reacting 2 moles of hexachlorocyclopentadiene per mole of 1,5 cyclooctadiene. The product contains 68% by weight of chlorine and is available as Marbon 23010 from the Marbon Division of the Borg-Warner Corporation.

For both chlorine sources the flame retardancy obtained using hydrated stannic oxide was superior to that obtained with antimony trioxide. The Limiting Oxygen Index for unmodified polypropylene is included for purposes of comparison.

What is claimed is:

1. In an improved flame retarding agent for polymers containing at least 50% of repeating units derived from olefinic hydrocarbons containing between 2 and 10 carbon atoms, wherein the flame retarding agent is present in an amount between 4 and 25%, based on the weight of the polymer, and consists essentially of an organic chlorinecontaining compound and a metal oxide synergist, the improvements which reside in 1. selecting the organic chlorine-containing compound from the group consisting of chlorinated cycloaliphatic hydrocarbons containing more than 50% by weight of chlorine, said hydrocarbons exhibiting a melting temperature of between 100° and 500°C. and which decompose to the extent of between 50 and 100% at temperatures between 300° and 500°C., and 2. selecting hydrated stannic oxide as the metal oxide;

wherein the chlorine-containing compound is present in an amount between 1 and 8 times the weight of the hydrated stannic oxide.

2. The improved flame retarding agent of claim 1 wherein the olefinic hydrocarbon is ethylene or propylene.

3. The improved flame retarding agent of claim 1 wherein the organic chlorine-containing compound is selected from the group consisting of dimeric hexachlorocyclopentadiene and reaction products of hexachlorocyclopentadiene with cyclic diolefins containing between 4 and 8 carbon atoms.

4. The improved flame retarding agent of claim 3 wherein the cyclic diolefin is 1,5-cyclooctadiene.

* * * * *